United States Patent
Khan et al.

(10) Patent No.: US 11,054,718 B1
(45) Date of Patent: Jul. 6, 2021

(54) ELECTRONIC SHUTTER FOR CONCEALING AND REVEALING A CAMERA

(71) Applicant: Facebook Technologies, LLC, Menlo Park, CA (US)

(72) Inventors: Saara Khan, Los Altos Hills, CA (US); Tony David, San Jose, CA (US); Sam Sarmast, Redmond, WA (US); Fletcher Nelson, Kent, WA (US); Staci Elaan, Kirkland, WA (US); Brian Kennedy, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/713,936

(22) Filed: Dec. 13, 2019

(51) Int. Cl.
*G03B 9/08* (2021.01)
*G02F 1/137* (2006.01)
(Continued)

(52) U.S. Cl.
CPC ............ *G03B 9/08* (2013.01); *G02B 26/005* (2013.01); *G02C 11/10* (2013.01); *G02F 1/137* (2013.01); *G02F 1/1334* (2013.01); *G02F 1/13306* (2013.01); *G02F 1/13363* (2013.01); *G02F 1/13439* (2013.01); *G02F 1/133528* (2013.01);
(Continued)

(58) Field of Classification Search
CPC ........ G03B 9/08; G02B 26/005; G02C 11/10; G02F 1/13306; G02F 1/1334; G02F 1/133528; G02F 1/13363; G02F 1/13439; G02F 1/137; G02F 1/163; G02F 2001/13345; G02F 2001/133531; G02F 2001/133633; G02F 2001/133638; G02F 2202/04
See application file for complete search history.

(56) References Cited

U.S. PATENT DOCUMENTS

2007/0071911 A1* 3/2007 Takaku .................. C09K 19/02
428/1.1
2010/0045773 A1* 2/2010 Ritchey ................ H04N 5/2254
348/36

(Continued)

OTHER PUBLICATIONS

Dierking, Ingo, "Polymer Network-Stabilized Liquid Crystals", Advanced Materials, vol. 12, No. 3, Sep. 24, 2000, pp. 167-181.
(Continued)

Primary Examiner — Nathanael R Briggs
(74) Attorney, Agent, or Firm — FisherBroyles, LLP

(57) ABSTRACT

The disclosed electronic shutter may include (1) an optical structure including a medium through which light from an environment passes to a lens of a camera for capturing an image of the environment; and (2) a controlling circuit that (a) detects a first condition of a signal, where the first condition indicates an activation of the camera, (b) controls, in response to the first condition, the optical structure such that the medium attains a transparent optical state, (c) detects a second condition of the signal, where the second condition indicates a deactivation of the camera, and (d) controls, in response to the second condition, the optical structure such that the medium attains a non-transparent optical state in a manner that prevents visual detection of the lens from the environment. Various other methods and systems are also disclosed.

20 Claims, 11 Drawing Sheets

(51) Int. Cl.
*G02F 1/1335* (2006.01)
*G02F 1/13363* (2006.01)
*G02F 1/163* (2006.01)
*G02B 26/00* (2006.01)
*G02F 1/1343* (2006.01)
*G02F 1/133* (2006.01)
*G02C 11/00* (2006.01)
*G02F 1/1334* (2006.01)

(52) U.S. Cl.
CPC .......... *G02F 1/163* (2013.01); *G02F 1/13345* (2021.01); *G02F 1/133531* (2021.01); *G02F 1/133633* (2021.01); *G02F 1/133638* (2021.01); *G02F 2202/04* (2013.01)

(56) References Cited

U.S. PATENT DOCUMENTS

| | | | | |
|---|---|---|---|---|
| 2014/0104517 A1* | 4/2014 | Shim | ..................... | G02F 1/1313 349/15 |
| 2020/0142232 A1* | 5/2020 | Demuth | ............. | G02F 1/13781 |
| 2020/0214148 A1* | 7/2020 | Teil | ..................... | G09G 3/3433 |

OTHER PUBLICATIONS

Wikipedia, "Cholesteric Liquid Crystal" URL: https://en.wikipedia.org/w/index.php?title=Cholesteric_liquid_crystal&oldid=918187964, as accessed on Dec. 13, 2019, 2 pages.

Wikipedia, "Electrochromic Devices", URL; https://en.wikipedia.org/w/index.php?title=Electrochromic_devices&oldid=923563370, as accessed on Dec. 13, 2019, 5 pages.

Row, Jason, "Electronic Shutters vs Mechanical Shutter Difference?", URL: www.lightstalking.com/electronic-shutters-vs-mechanical-shutters/, Light Stalking, Jan. 22, 2019, pp. 1-11.

Wikipedia, "Electrowetting", URL: https://en.wikipedia.org/w/index.php?title=Electrowetting&oldid=930523201, as accessed on Dec. 13, 2019, 7 pages.

"LCD Shutters from Liquid Crystal Technologies. Our liquid crystal shutters can solve many different design challenges", URL: www.liquidcrystaltechnologies.com/tech_support/LCDShutterConsiderations.htm, May 22, 2008, pp. 1-3.

"LCD Shutters from Liquid Crystal Technologies", URL: www.liquidcrystaltechnologies.com/products/LCDShutters.htm, May 1, 2008, 1 page.

Wikipedia, "Liquid Crystal," URL: https://en.wikipedia.org/w/index.php?title=Liquid_crystal&oldid=930566603, as accessed on Dec. 13, 2019, 24 pages.

Wikipedia, "Liquid-crystal Display," URL: https://en.wikipedia.org/w/index.php?title=Liquid-crystal_display&oldid=929879826, as accessed on Dec. 13, 2019, 27 pages.

Yu et al., "A new TN-ECB mode reflective liquid crystal display with large cell gap and low operating voltage", URL: https://pdfs.semanticscholar.org/7afc/391d950e0c707d572e864d451b4d712a0aa7.pdf, as accessed on Nov. 18, 2019, 5 pages.

Wikipedia, "Twisted nematic field effect", URL: https://en.wikipedia.org/w/index.php?title=Twisted_nematic_fleld_effect&oldid=930023618, as accessed on Dec. 13, 2019, 5 pages.

* cited by examiner

ELECTRONIC SHUTTER FOR CONCEALING AND REVEALING A CAMERA

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
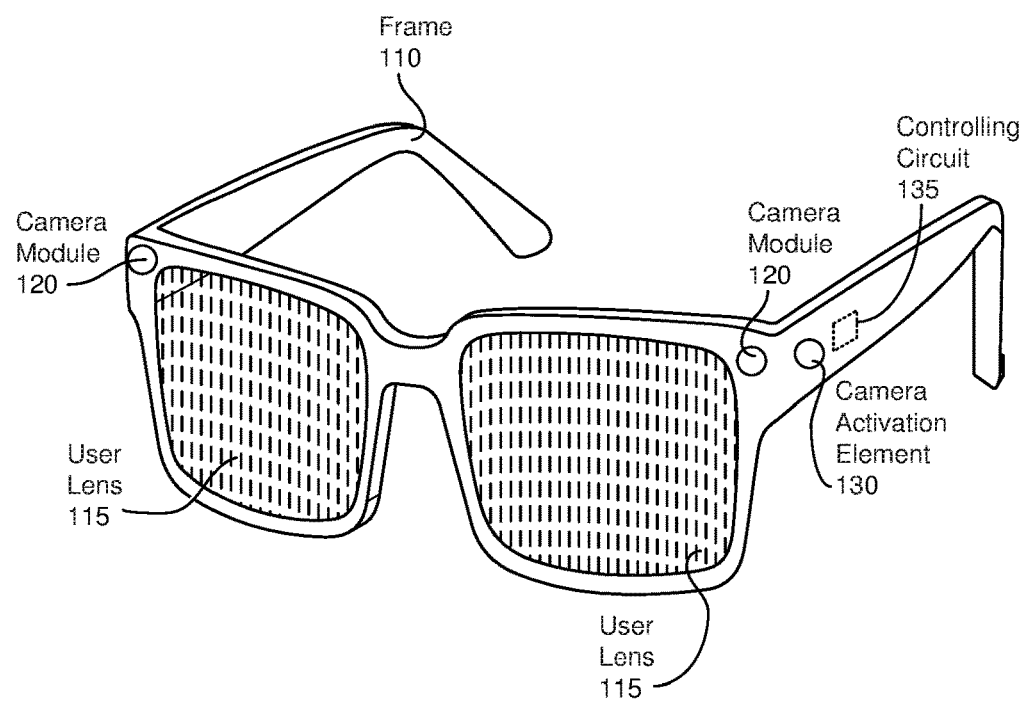
FIG. 1 is a perspective view of an exemplary eyewear device employing a camera module that includes an electronic shutter for concealing and revealing a camera.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

In many types of video recording devices, as well as some still image capture devices, an indication as to when the device is recording or capturing is presented to the environment being recorded or captured as a common courtesy. For example, in the case of a camcorder, a red light may flash while the device is in recording mode. For a still image camera, the bright flash of a light, or the sound of a mechanical shutter, may signify the capturing of an image. Even in the case of television cameras and web cameras, active recording by the device is often accompanied by a lighted indicator of some type.

While such an indicator may function as a notification to a potential subject that a recording or image capture is in progress, the visible contrast between the "recording" and "not recording" states of the indicator may be rather stark, possibly causing a distraction to the subject of the recording. Moreover, the addition of the indicator on a front-facing surface of the recording device may consume valuable area that could be dedicated to other device functions.

The present disclosure is generally directed to an electronic shutter that reveals and conceals the presence of a camera (e.g., concealing or revealing the lens of the camera that facilitates the recording of video). As will be explained in greater detail below, embodiments of the present disclosure may include systems or methods that employ an optical structure having a medium through which a camera lens may receive light from the environment to be recorded). In at least some embodiments, the optical structure may be electronically controlled such that the medium attains a transparent optical state or a non-transparent optical state. For example, in the transparent optical state, the medium may allow the camera to capture images of the environment while also facilitating detection of the camera from the environment. In the non-transparent optical state, the medium may prevent both use of the camera to capture image of the environment and prevent detection of the presence the camera.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-11, detailed descriptions of exemplary optical structures, systems and methods of providing an electronic shutter for revealing and concealing a camera. An exemplary eyewear device incorporating a camera module, including an associated electronic shutter for revealing and concealing the camera, is discussed in connection with FIG. 1. A discussion of the transparent and non-transparent optical states of an optical structure of the camera module is presented in relation to FIG. 2. An exemplary method of operating an electronic shutter that reveals and conceals a camera is described in conjunction with FIG. 3. In reference to FIGS. 4-10, various types of media that may be employed in the optical structure to provide electronic shutter functionality are discussed in detail. An exemplary system that includes a camera in addition to an optical structure providing electronic shutter functionality for the camera is explained in relation to FIG. 11.

FIG. 1 is a perspective view of an exemplary eyewear device 100 that includes a frame 110 configured to hold a pair of user lenses 115 (e.g., standard prescription lenses, prescription or non-prescription sunglass lenses, and so on) in front of a user's eyes. In yet other embodiments, eyewear device 100 may be an artificial reality device (e.g., a virtual reality device, an augmented reality device, a mixed reality device, and the like), by which user lenses 115 may operate as display devices to provide an image or a series of images to the user in lieu of, or in addition to, a view of the environment surrounding the user.

Moreover, eyewear device 100 may include one or more sensors (not shown in FIG. 1) that generate measurement signals in response to the translational motion and/or orientation of eyewear device 100 and may be located on substantially any portion of frame 110. Such sensors may include, but are not limited to, a position sensor, an inertial measurement unit (IMU), a depth camera assembly, a structured light emitter and/or detector, or any combination thereof. In some embodiments, eyewear device 100 may or may not include a sensor or may include more than one sensor. In embodiments in which sensor 140 includes an IMU, the IMU may generate calibration data based on measurement signals from sensor 140. Further, such sensors may include, without limitation, accelerometers, gyroscopes, magnetometers, other suitable types of sensors that detect motion, sensors used for error correction of the IMU, or some combination thereof.

In some embodiments, eyewear device 100 may also include one or more microphones with one or more acoustic transducers (also not shown in FIG. 1). Acoustic transducers may be transducers that detect air pressure variations induced by sound waves. Each acoustic transducer may be configured to detect sound and convert the detected sound into an electronic format (e.g., an analog or digital format). In some embodiments, one or more acoustic transducers may be used as output transducers (e.g., speakers). For example, the acoustic transducers may be earbuds or any other suitable type of headphone or speaker.

As depicted in FIG. 1, eyewear device 100 may also include one or more camera modules 120, each of which may incorporate an electronic shutter for concealing and revealing a camera (e.g., a still image camera, a video camera, etc.) of camera module 120. As shown, each camera module 120 may be positioned proximate a user lens 115 in a front-facing orientation, although other locations and orientations for camera module 120 are also possible.

Eyewear device 100 may also include a camera activation element 130 (e.g., a button, a switch, etc.) by which the user may activate the camera (e.g., to initiate the capture an image, to initiate and/or terminate the capture of video, and the like). As is described below, a signal from camera activation element 130 may also initiate the revealing or concealing of the camera by way of a controlling circuit 135 that controls the operation of the electronic shutter, as described in greater detail below. As illustrated in FIG. 1, camera activation element 130 and controlling circuit 135 are located along an ear section of frame 110, although other locations for either or both camera activation element 130 and controlling circuit 135 are also possible in other examples. In addition, in some embodiments, another portion or circuit of eyewear device 100 may initiate camera activation and deactivation without user involvement.

While camera module 120 is described herein as being incorporated within eyewear device 100, in other embodiments, camera module 120 may be incorporated into other devices or products (e.g., clothing, headwear, and so on) or be configured as a standalone device (e.g., a security camera, a web camera, and so forth).

Figure 2:
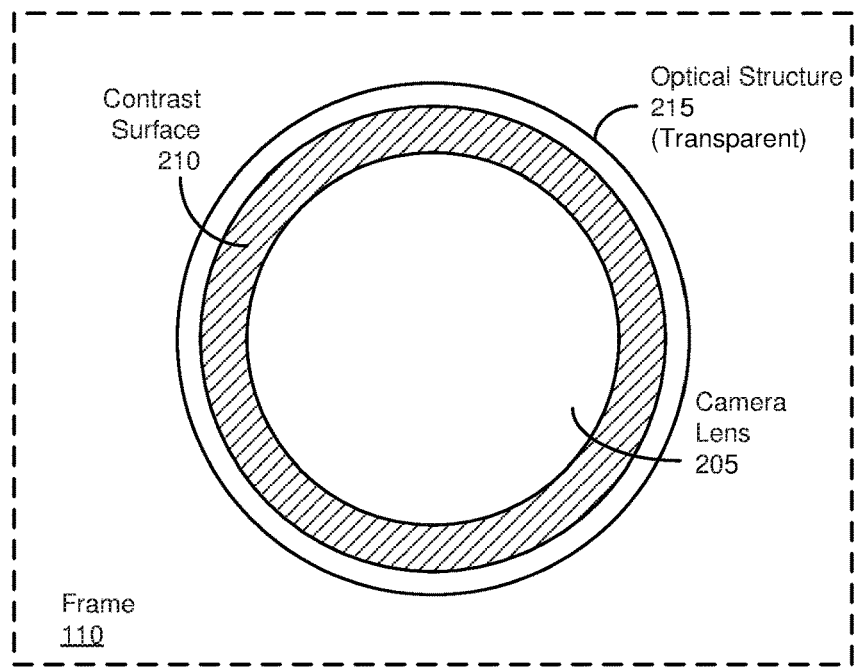
FIG. 2 is a front view of the camera module of FIG. 1 having an optical structure that serves as the electronic shutter, with the optical structure being depicted in a transparent state and a non-transparent state.
Figure 2:
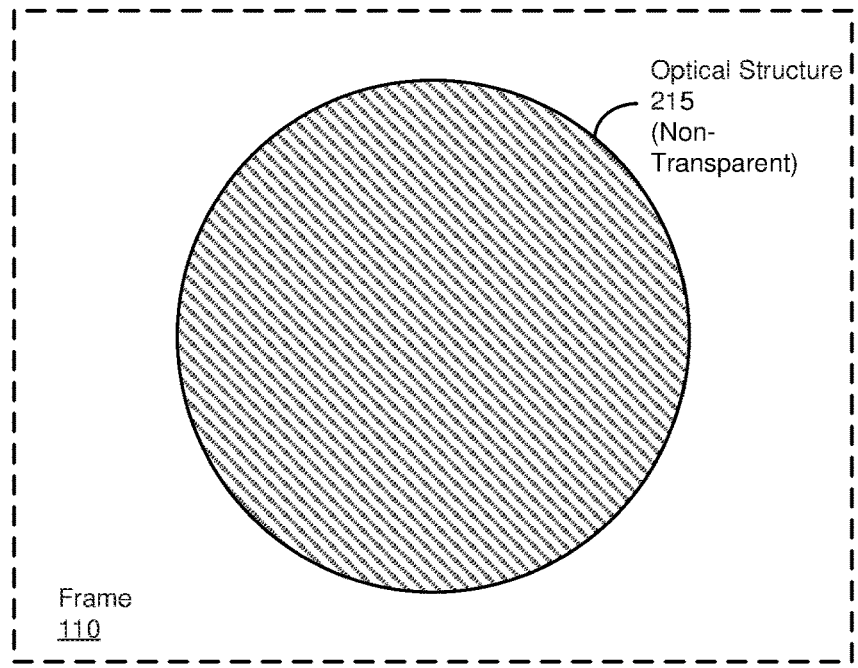

FIG. 2 is a front view of camera module 120 mounted in frame 110 and depicted in two different optical states: a transparent state corresponding to an activation of the camera, and a non-transparent state corresponding to a deactivation of the camera. In some embodiments, one or more discrete or continuous transition states between those illustrated in FIG. 2 are also possible. For example, over some period of time (e.g. fractions of a second, one or more seconds, etc.), optical structure 215 may transition between a substantially transparent state and a substantially translucent or opaque state.

In the transparent optical state, optical structure 215 may reveal a camera lens 205 of the camera to the surrounding environment and may allow light to pass from the environment through optical structure to camera lens 205 to capture one or more images of the environment. In some examples, a contrast surface 210 (e.g. proximate to or surrounding camera lens 205) may also be revealed. In some examples, contrast surface 210 may exhibit a color (e.g., red, orange, etc.), brightness, or other optical quality that provides a contrast to the non-transparent optical state of optical structure 215. Oppositely, in some embodiments, the non-transparent optical state of optical structure 215 may prevent the reception of light from the environment through optical structure 215 at camera lens 205, thus preventing imaging by the camera of the environment, as well as concealing camera lens 205 and contrast surface 210 from an external observer. In some examples, optical structure 215 may have an optical quality (e.g., color, brightness, and the like) that is less noticeable to an observer in the environment than contrast surface 210. In some examples, the non-transparent optical state of optical structure 215 may exhibit an appearance similar to that of frame 110, thus possibly providing a more aesthetically pleasing or consistent appearance for eyewear device 100.

Figure 3:
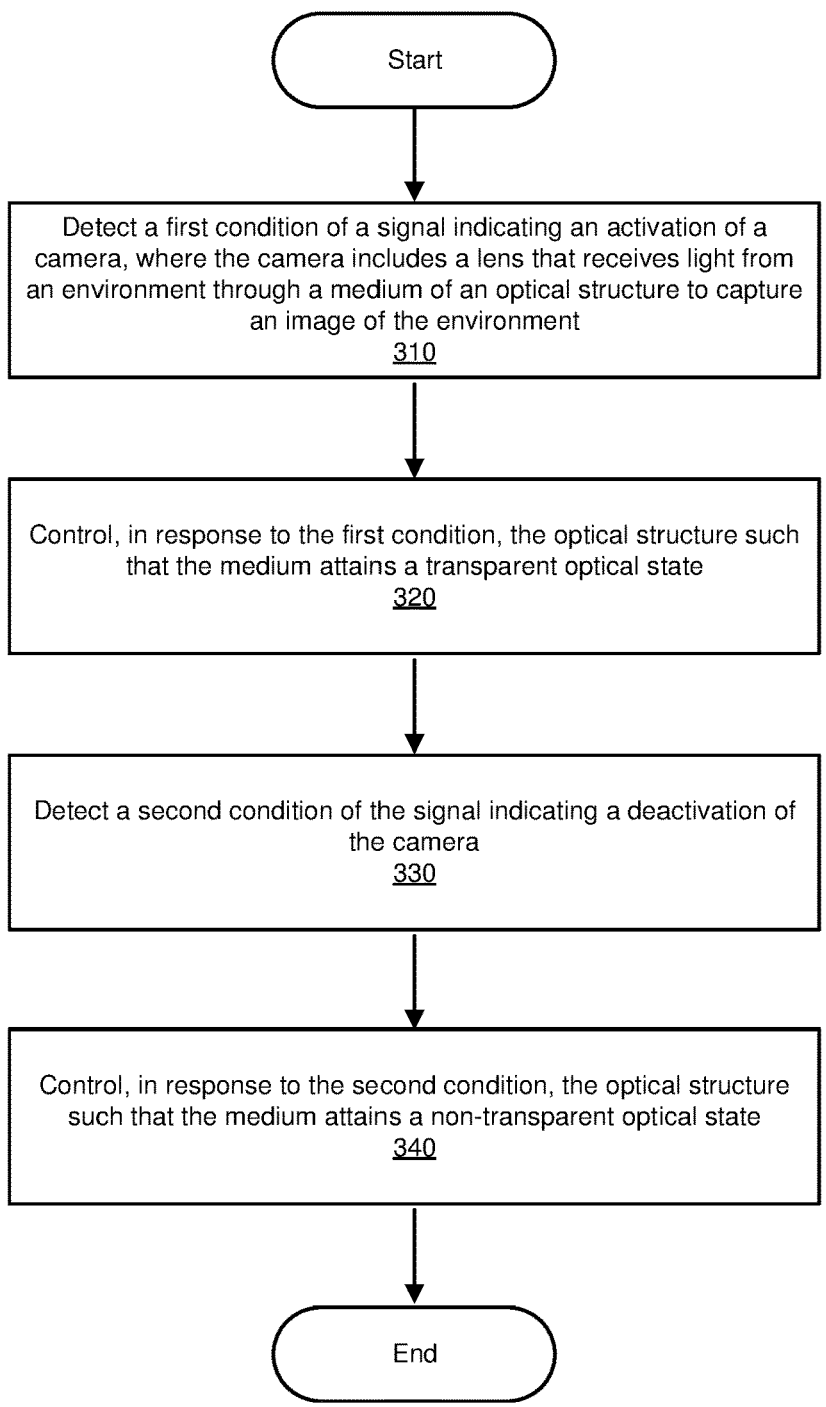
FIG. 3 is a flow diagram of a method of providing the electronic shutter by operating the optical structure.

FIG. 3 is a flow diagram of an exemplary method 300 for providing an electronic shutter for concealing and revealing a camera. In some embodiments, a portion of one or more of the steps shown in FIG. 3 may be performed by a special circuit (e.g., controlling circuit 135 of FIG. 1) and/or any suitable computer-executable code and/or computing system, including the system(s) illustrated in FIG. 11, discussed more fully below. In one example, each of the steps shown in FIG. 1 may represent an algorithm whose structure includes and/or is represented by multiple sub-steps, examples of which will be provided in greater detail below.

As illustrated in FIG. 3, at step 310, a first condition of a signal (e.g., provided by camera activation element 130) indicating an activation (e.g., initiated by the user or by a circuit of eyewear device 100) of a camera (e.g., incorporated in camera module 120) may be detected. In some embodiments, the camera may include a lens (e.g., camera lens 205) that receives light from an environment through a medium of an optical structure (e.g., optical structure 215) to capture an image of the environment. At step 320, in response to the first condition, the optical structure may be controlled (e.g., electronically) such that the medium attains a transparent optical state. At step 330, a second condition of the signal indicating a deactivation of the camera may be detected. Accordingly, at step 340, in response to the second condition, the optical structure may be controlled such that the medium attains a non-transparent optical state.

FIGS. 4-10 are conceptual side views of various embodiments of optical structure 215, each of which employs a different type of medium whose optical state may be controlled by controlling circuit 135 to attain a transparent and a non-transparent optical state. In the various embodiments described below, controlling circuit 135 may control each medium electronically (e.g., via applying a direct-current (DC) or alternative-current (AC) voltage to the medium, or by removing such a voltage therefrom), possibly by way of processor, voltage generator, and/or other circuitry. However, other methods or means of controlling a medium of optical structure 215 (e.g., via changes in electrical current, via thermal changes, and the like) are also possible in other embodiments. Further, in each of FIGS. 4-10, a portion of optical structure 215 is shown in cross-section, with various dimensions of optical structure 215 not presented to scale to facilitate presentation of the information provided below. Additionally, in each optical structure 215 of FIGS. 4-10, an optical axis of camera lens 205 is presumed to be aligned vertically, and thus oriented perpendicularly to each plane or layer of the particular optical structure 215 being described.

Figure 4:
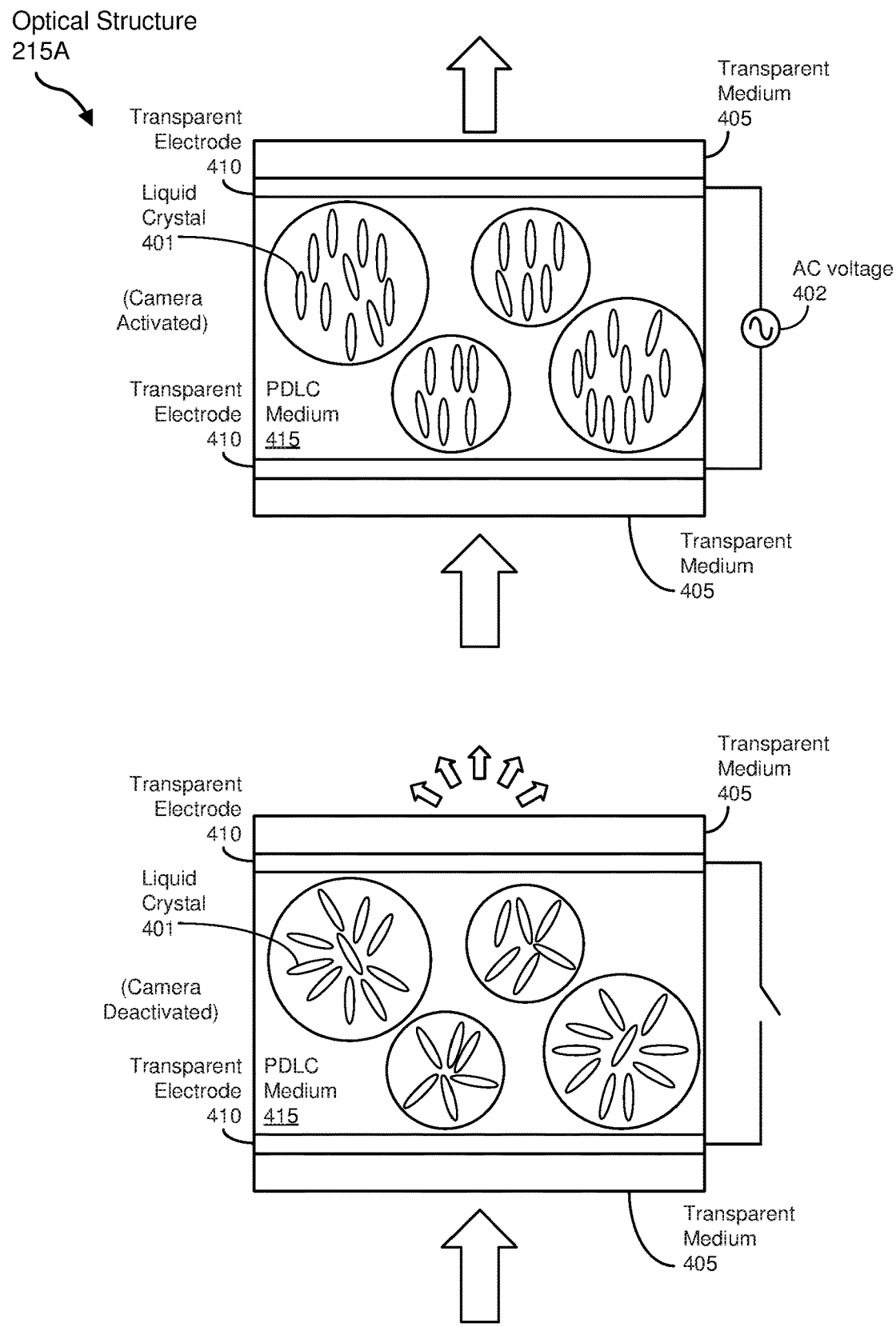
FIG. 4 is a conceptual side view of an exemplary optical structure employing a polymer-dispersed liquid crystal (PDLC) medium in a transparent state and a non-transparent state.

FIG. 4, for example, is a conceptual side view of an exemplary optical structure 215A employing a polymer-dispersed liquid crystal (PDLC) medium 415 in both a transparent optical state (upper part of FIG. 4) and a non-transparent optical state (lower part of FIG. 4). In optical structure 215A, as well as in some other embodiments of optical structure 215, a transparent medium 405 may be located at each side of optical structure 215A, such as at a side facing camera lens 205 and an opposing side facing the environment to be imaged. One embodiment of transparent medium 405 may be glass, although other types of transparent and near-transparent media may be employed in other examples.

Also, as shown in FIG. 4, adjacent to each transparent medium 405 and PDLC medium 415 may be a corresponding transparent electrode 410. Example materials from which transparent electrode 410 may be manufactured include, but are not limited to, indium tin oxide (ITO), transparent conductive oxide (TCO), and various conductive polymers. As is shown in the various embodiments described below, transparent electrodes 410 may be employed by controlling circuit 135 to apply a voltage across a medium (e.g., PDLC medium 415) to alter or maintain a particular transparent or non-transparent state for that medium.

In the particular example of FIG. 4, optical structure 215A includes PDLC medium 415 located between transparent electrodes 410. In some embodiments, PDLC medium 415 includes a plurality of domains or groups of liquid crystals 401 (e.g., nematic liquid crystals) distributed within a solid polymer medium. In a state in which no voltage is applied across PDLC medium 415, as depicted in the lower portion of FIG. 4, liquid crystals 401 may be at least somewhat randomly oriented, resulting in the scattering of light as it passes through PDLC 415, possibly resulting in a non-transparent state (e.g., having a translucent or opaque appearance) of optical structure 215A from the point of view of an observer in the environment external to camera module 120. Such an optical state may both prevent an effective amount of light to pass from the environment to camera lens 205 to image the environment and may also conceal camera lens 205 from the environment.

However, as illustrated in the upper portion of FIG. 4, application of an AC voltage 402 may align liquid crystals 401 of each domain substantially along an electric field formed between transparent electrodes 410, and thus along the optical axis of camera lens 205. Consequently, during application of AC voltage 402 (e.g., 10-20 volts AC), PDLC medium 415, and optical structure 215A in general, may exhibit a substantially transparent optical state, thus possibly revealing camera lens 205 and allowing sufficient light to pass from the environment through optical structure 215A to camera lens 205 to image the environment while also revealing camera lens 205 to the environment. In some embodiments, some percentage of light may be lost due to some scattering still present while PDLC medium 415 remains in a transparent optical state. In some examples, the magnitude of AC voltage 402 may be related to the level of transparency exhibited by PDLC medium 415, thus facilitating transitional states of semi-transparency between the non-transparent optical state and the transparent optical state depicted in FIG. 4.

Figure 5:
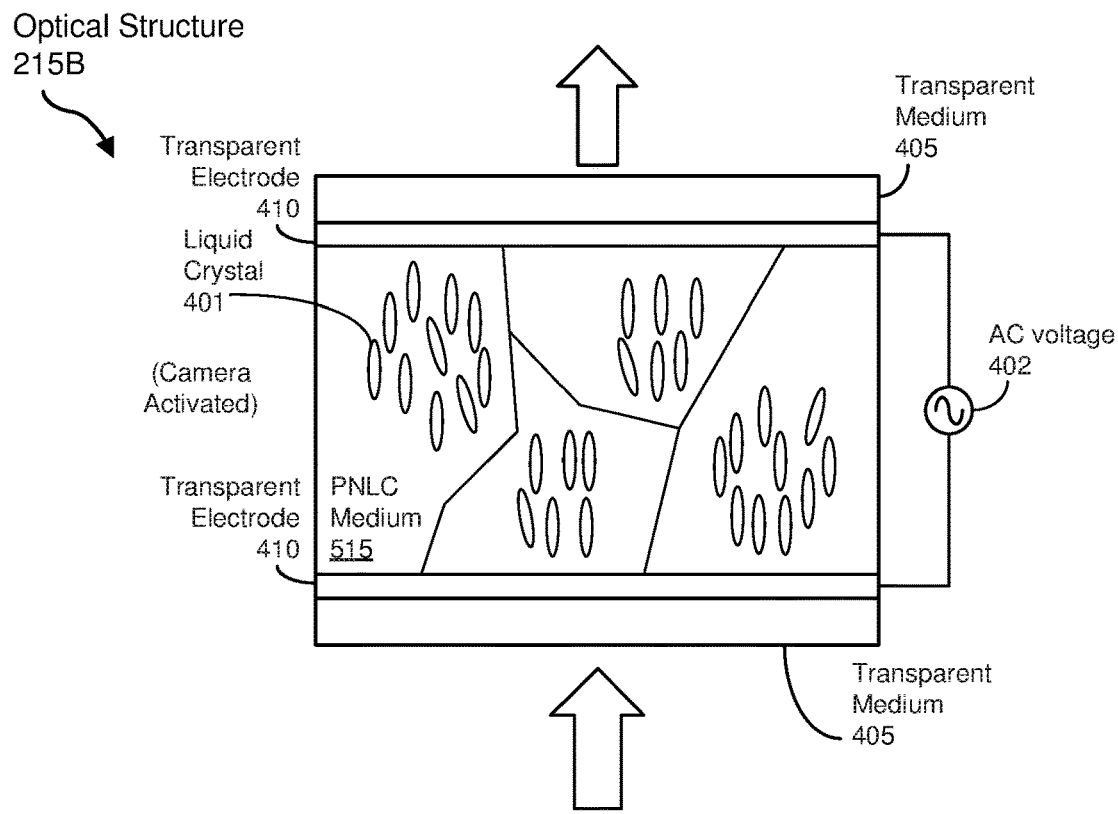
FIG. 5 is a conceptual side view of an exemplary optical structure employing a polymer-network-stabilized liquid crystal (PNLC) medium in a transparent state and a non-transparent state.
Figure 5:
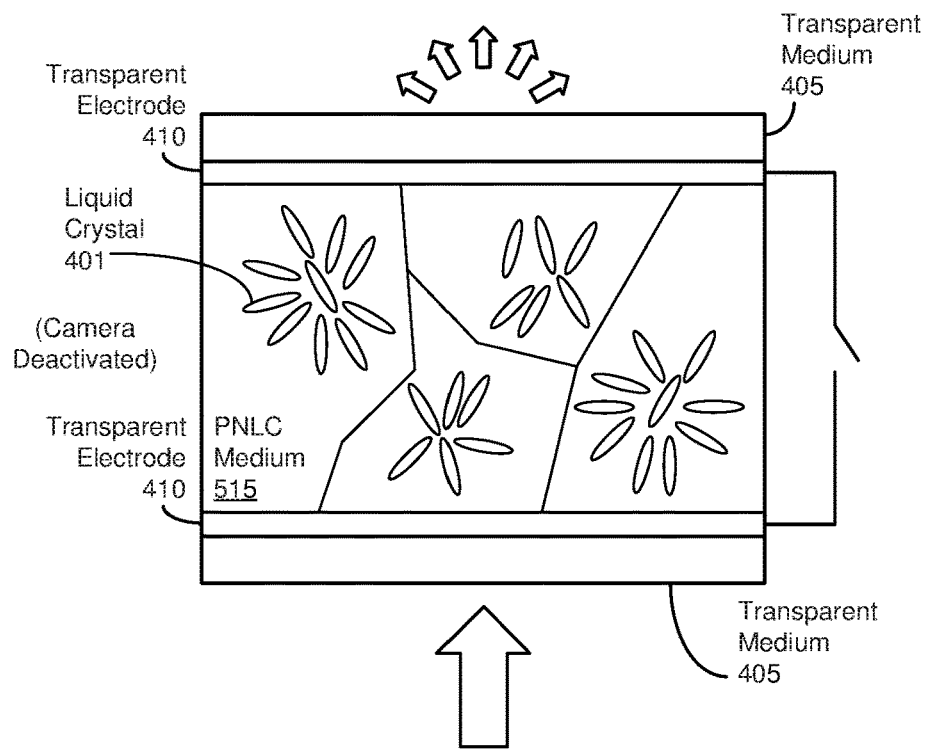

FIG. 5 is a conceptual side view of an exemplary optical structure 215B employing a polymer-network-stabilized liquid crystal (PNLC) medium 515 in both a transparent optical state (upper part of FIG. 5) and a non-transparent optical state (lower part of FIG. 5). Similar to optical structure 215A of FIG. 4, optical structure 215B may include two elements of transparent medium 405, each of which is adjacent to a corresponding transparent electrode 410 to apply an AC voltage 402 across PNLC medium 515. Instead of forming distinct phase-separated regions or domains of liquid crystals 401, as is the case with PDLC medium 415, PNLC medium 515 may employ less polymer to create a branched polymer network separating groups or domains of liquid crystals 401. However, liquid crystals 401 of PNLC medium 515 may react in a manner similar to liquid crystals 401 of PDLC medium 415.

More specifically, in the absence of a voltage across PNLC medium 515, as shown in the lower portion of FIG. 5, liquid crystals 401 may be somewhat randomly oriented, resulting in the scattering of light as it passes through PNLC 515, possibly resulting in a non-transparent state (e.g., a translucent or opaque appearance) of optical structure 215B, which may prevent a sufficient level of light to pass to camera lens 205 for imaging the environment while also concealing camera lens 205. However, as indicated in the upper portion of FIG. 5, application of AC voltage 402 (e.g., 10-20 volts AC) may align liquid crystals 401 substantially along an electric field formed between transparent electrodes 410. Accordingly, during application of AC voltage 402, PNLC medium 515 may exhibit a substantially transparent optical state, thus possibly revealing camera lens 205 to the environment and allowing sufficient light to pass from the environment through optical structure 215B to camera lens 205 to image the environment while also revealing camera lens 205. In some examples, as with PDLC medium 415, the magnitude of AC voltage 402 may be related to the level of transparency exhibited by PNLC medium 515, thus facilitating transitional states of semi-transparency between the non-transparent and transparent optical states.

Figure 6:
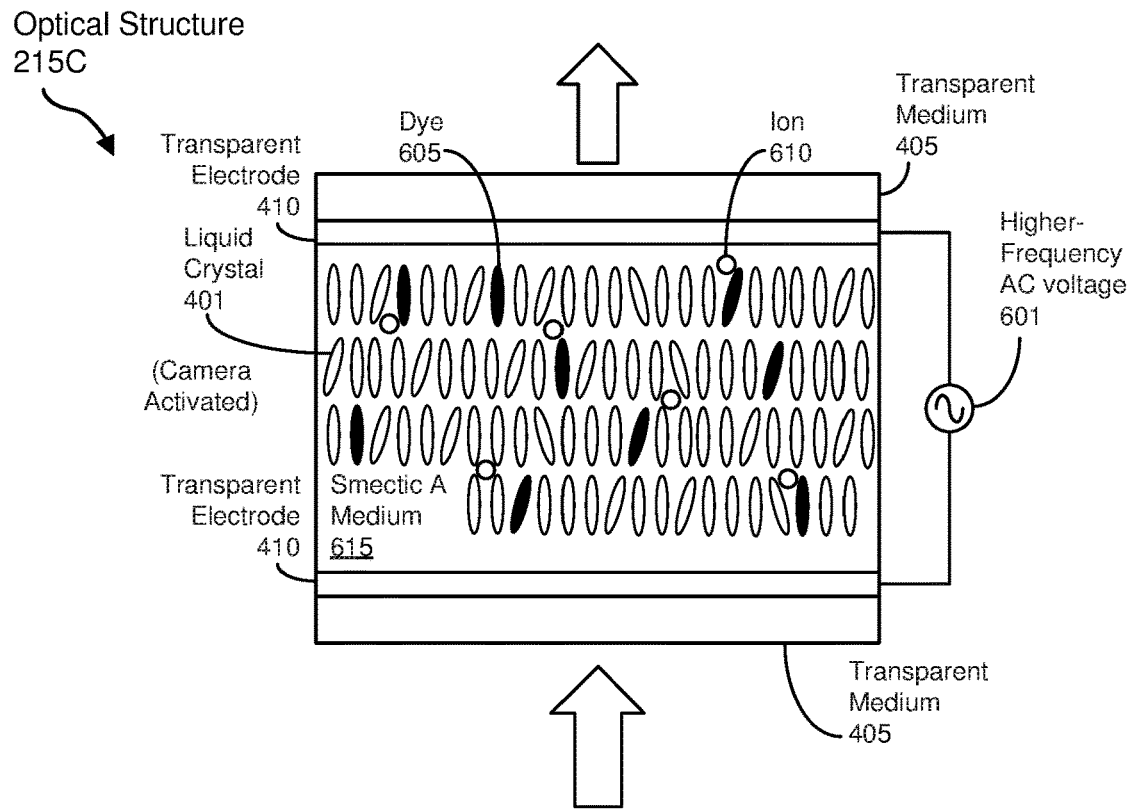
FIG. 6 is a conceptual side view of an exemplary optical structure employing a smectic A liquid crystal medium in a transparent state and a non-transparent state.
Figure 6:
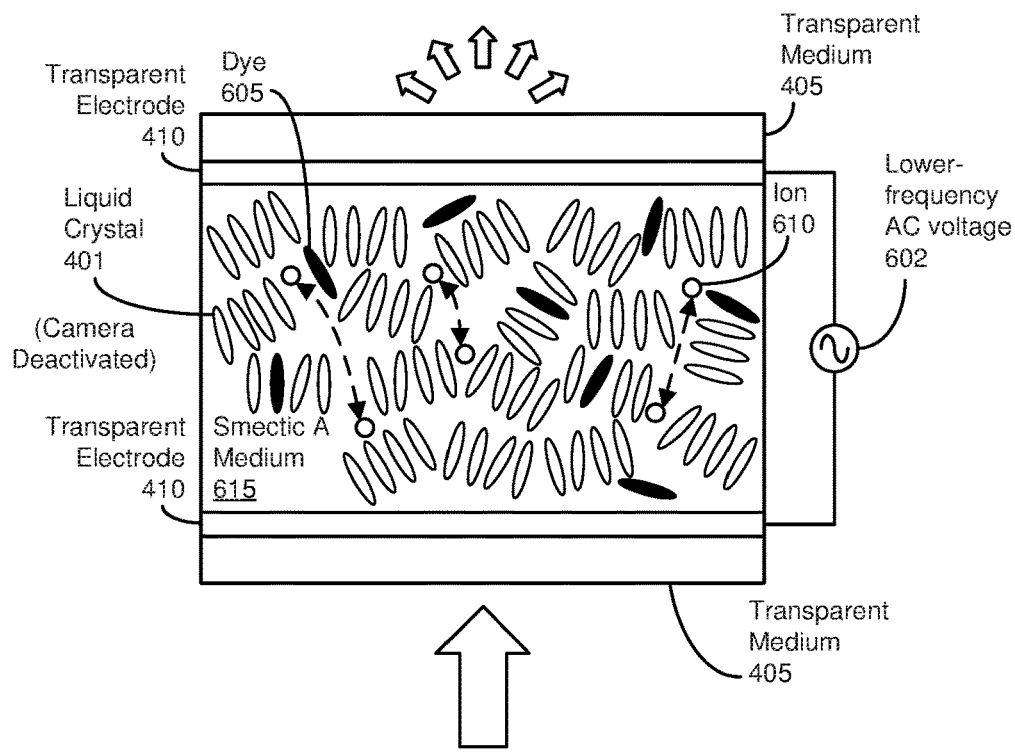

FIG. 6 is a conceptual side view of an exemplary optical structure 215C employing a smectic A liquid crystal medium 615 in a transparent state (upper portion of FIG. 6) and a non-transparent state (lower portion of FIG. 6). As discussed with respect to the embodiments depicted in FIGS. 4 and 5, optical structure 215C may include two elements or plates of transparent medium 405, each of which may be adjacent to a corresponding transparent electrode 410 for applying a voltage across smectic A medium 615. In some embodiments, smectic A medium 615 may include liquid crystals 401 that may react to an AC voltage. Further, smectic A medium 615 may include a plurality of mobile ions 610 that may also react to an AC voltage.

More specifically, in some examples, in the presence of an AC voltage 602 of a relatively low frequency, ions 610 may react by moving about smectic A medium 615, causing the formation of separate, stable domains of liquid crystals 401 oriented in a variety of directions about smectic A medium 615, thus possibly causing a scattering of light passing into optical structure 215C from the surrounding environment toward camera lens 205. Oppositely, in the presence of a higher-frequency AC voltage 601, ions 610 may be unable to react via movement within smectic A medium 615, thus substantially reducing their effect upon liquid crystals 401. Consequently, in at least some embodiments, liquid crystal

401 may substantially align along the electric field induced by higher-frequency AC voltage 601, and may form a number of layers within smectic A medium 615, thus placing smectic A medium 615 in a substantially transparent optical state by allowing most of the light from the environment to pass through optical structure 215C toward camera lens 205.

Moreover, in some embodiments, smectic A medium 615 may be doped with a dye 605 (e.g., an anisotropic dye that possesses a more linear shape similar to liquid crystals 401). Accordingly, in the presence of lower-frequency AC voltage 602, in which domains of liquid crystals 401 of varying orientations are formed, portions of dye 605 may also acquire varying orientations, thus possibly causing the non-transparent state of optical structure 215C to provide some tinting or coloring provided by dye 605, as opposed to a grayish or whitish translucent or opaque appearance. Oppositely, in the presence of higher-frequency AC voltage 601, in which liquid crystals 401 align along the electric field, liquid crystals 401 may substantially urge dye 605 into a similar alignment, thus essentially eliminating the tinted appearance of smectic A medium 615 and facilitating the substantially transparent optical of optical structure 215C.

Figure 7:
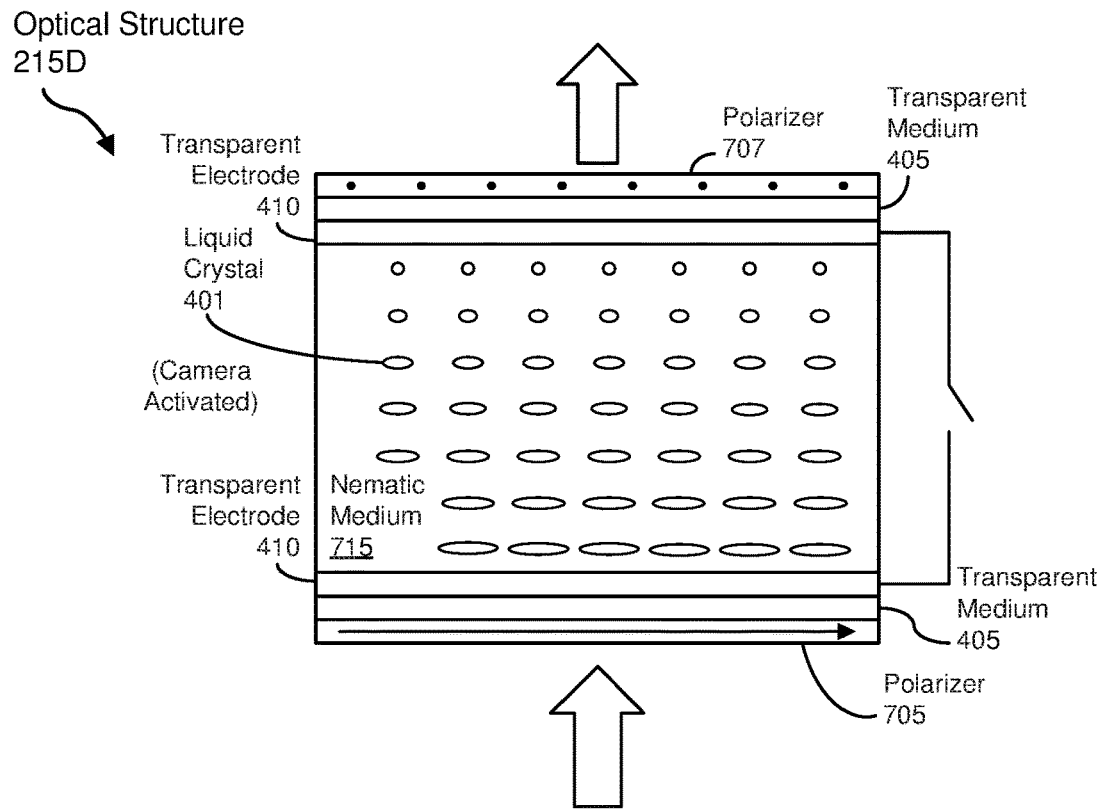
FIG. 7 is a conceptual side view of an exemplary optical structure employing a nematic liquid crystal medium in a transparent state and a non-transparent state.
Figure 7:
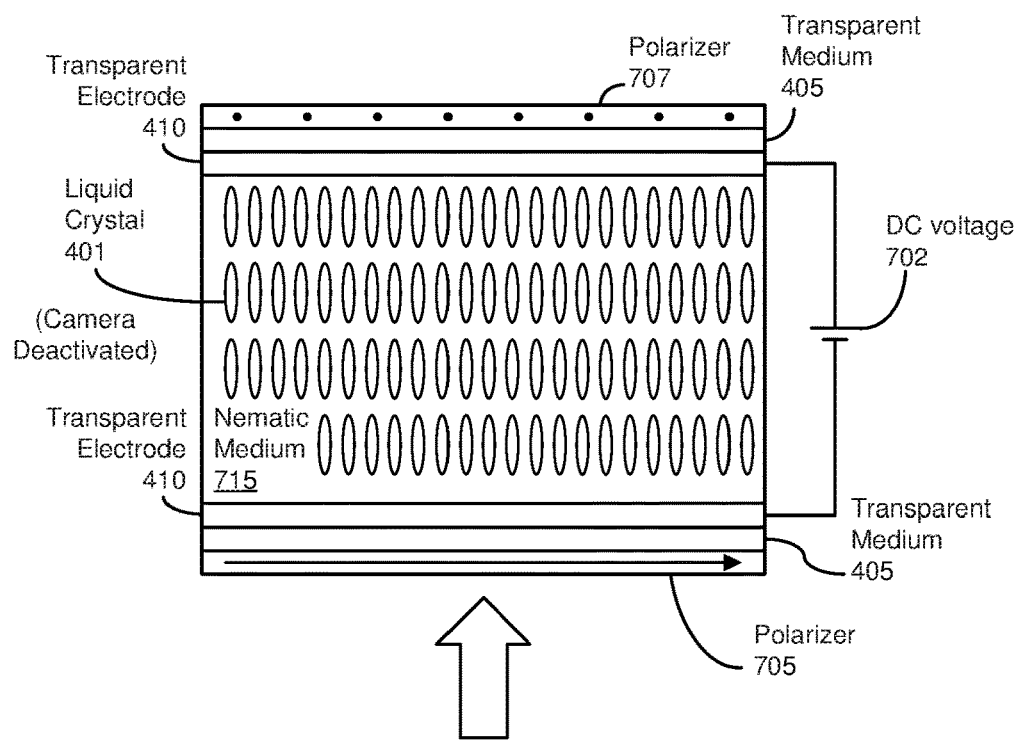

FIG. 7 is a conceptual side view of an optical structure 215D employing a nematic medium 715 of liquid crystals 401 in both a transparent state (top portion of FIG. 7) and a non-transparent state (bottom portion of FIG. 7). As with the embodiments described above with respect to FIGS. 4-6, optical structure 215D may include two transparent media 405, each of which may be positioned adjacent a corresponding transparent electrode 410. Additionally, optical structure 215D may include a polarizer located adjacent to each transparent medium 405. More specifically, a first polarizer 705 may be oriented along a first direction (e.g., parallel to corresponding transparent medium 405 and directed left-to-right in the arrangement of FIG. 7), and a second polarizer 707 may be oriented along a second direction (e.g., parallel to corresponding transparent medium 405 and oriented 90 degrees relative to first polarizer 705). Further, nematic medium 715 may be located between transparent electrodes 410. In some embodiments, in a state in which no voltage is applied across nematic medium 715 via transparent electrodes 410, liquid crystals 401 of nematic medium 715 may be substantially arranged (e.g., by way of one or more alignment layers (not shown in FIG. 7) that coat each transparent electrode 410) such that liquid crystals 401 form a helical structure that links first polarizer 705 to second polarizer 707, where liquid crystals 401 near each transparent electrode 410 align with the corresponding polarizer 705, 707. Consequently, light encountering first polarizer 705 may be polarized accordingly prior to encountering nematic medium 715. Once entering nematic medium 715, the polarization state of that light may rotated according to the helical structure of liquid crystals 401, whereby the polarization state of light exiting nematic medium 715 may then match second polarizer 707, thus allowing that light to exit optical structure 215D. Accordingly, when no voltage is applied across nematic medium 715, at least some significant portion of light entering optical structure 215D may pass therethrough, thus providing a transparent optical state.

However, when applying a voltage (e.g., a DC voltage 702) across nematic medium 715, liquid crystals 401 may forego their helical structure (e.g., by aligning along an electric field generated by DC voltage 702), thus facilitating the light polarized by first polarizer 705 to be passed with its polarization state substantially unaltered through nematic medium 715 prior to encountering second polarizer 707. As the polarization state of that light does not match the polarization of second polarizer 707, little-to-no light may pass through second polarizer 707, thus essentially placing optical structure 215D in a non-transparent (e.g., opaque) optical state.

In some embodiments, to operate substantially as described above, optical structure 215D may be configured as a twisted nematic (TN) cell, a microdomain TN cell, a "Pi" cell, an electrically-controlled birefringence (ECB) cell, and the like.

Figure 8:
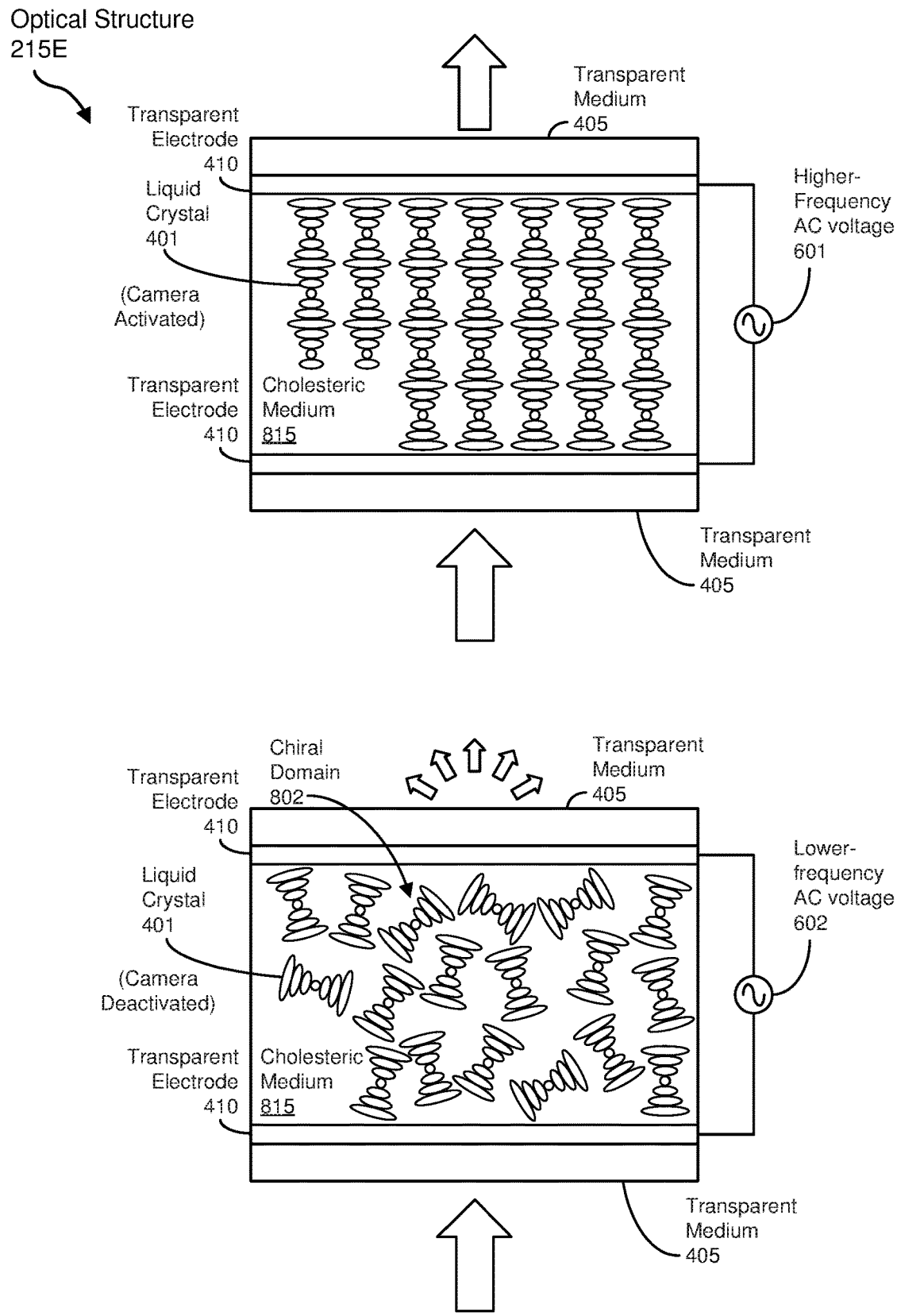
FIG. 8 is a conceptual side view of an exemplary optical structure employing a cholesteric liquid crystal medium in a transparent state and a non-transparent state.

FIG. 8 is a conceptual side view of an exemplary optical structure 215E employing a cholesteric liquid crystal medium 815 in a transparent state (top portion of FIG. 8) and a non-transparent state (bottom portion of FIG. 8). Similar to the embodiments described above with respect to FIGS. 4-7, optical structure 215E may include two transparent media 405, each of which may be positioned adjacent a corresponding transparent electrode 410. Between transparent electrodes 410 may be positioned cholesteric medium 815 including liquid crystals 401 in a cholesteric phase, in which liquid crystals 401 may form chiral, or "twisted," domains. As shown in FIG. 8, at times during which a relatively high frequency AC voltage 601 is applied across cholesteric medium 815, chiral domains substantially linking transparent electrodes 410 may be aligned along an electric field generated by higher-frequency AC voltage 601, thus forming longer "macrodomains" that allow light entering optical structure 215E to pass essentially directly though cholesteric medium 815 to facilitate a transparent optical state. At other times, when a lower-frequency AC voltage 602 relative to higher-frequency AC voltage 601, smaller (e.g., "micro") chiral domains 802 of liquid crystals 401 may form that are variously oriented within cholesteric medium 815 that may cause light entering optical structure 215E to be scattered within cholesteric medium 815, thus producing a non-transparent optical state for optical structure 215E.

Figure 9:
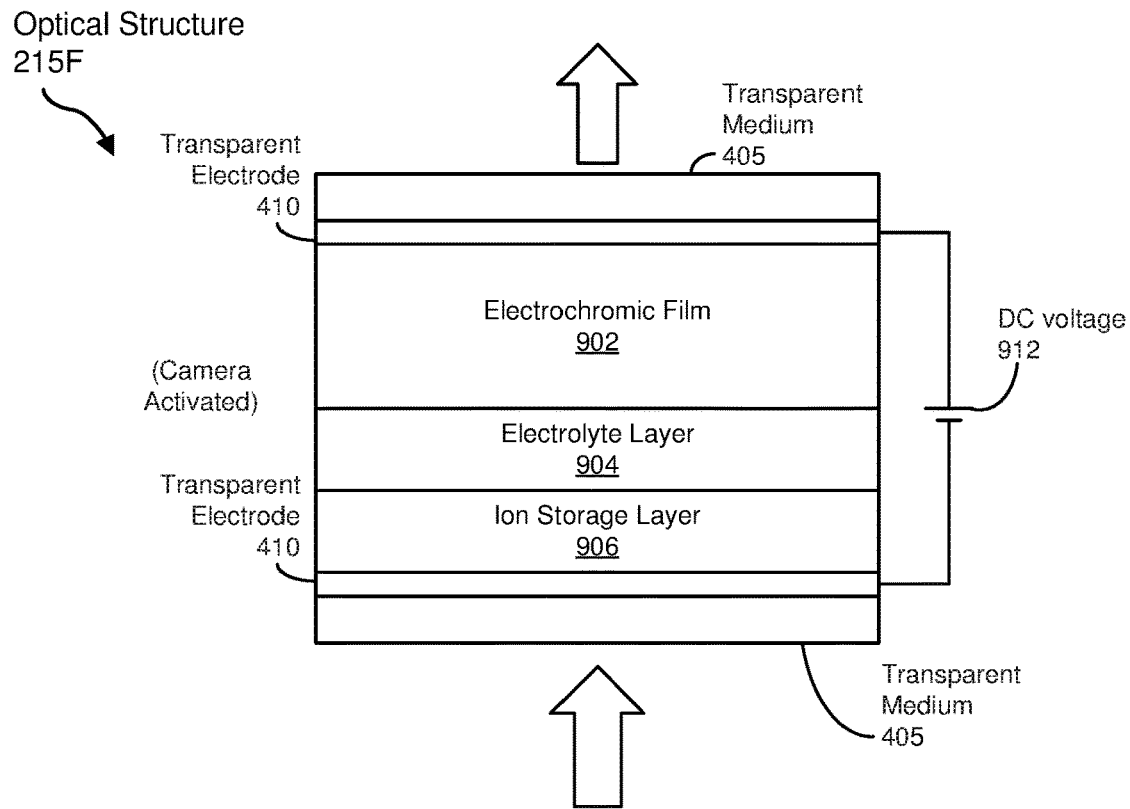
FIG. 9 is a conceptual side view of an exemplary optical structure employing an electrochromic film in a transparent state and a non-transparent state.
Figure 9:
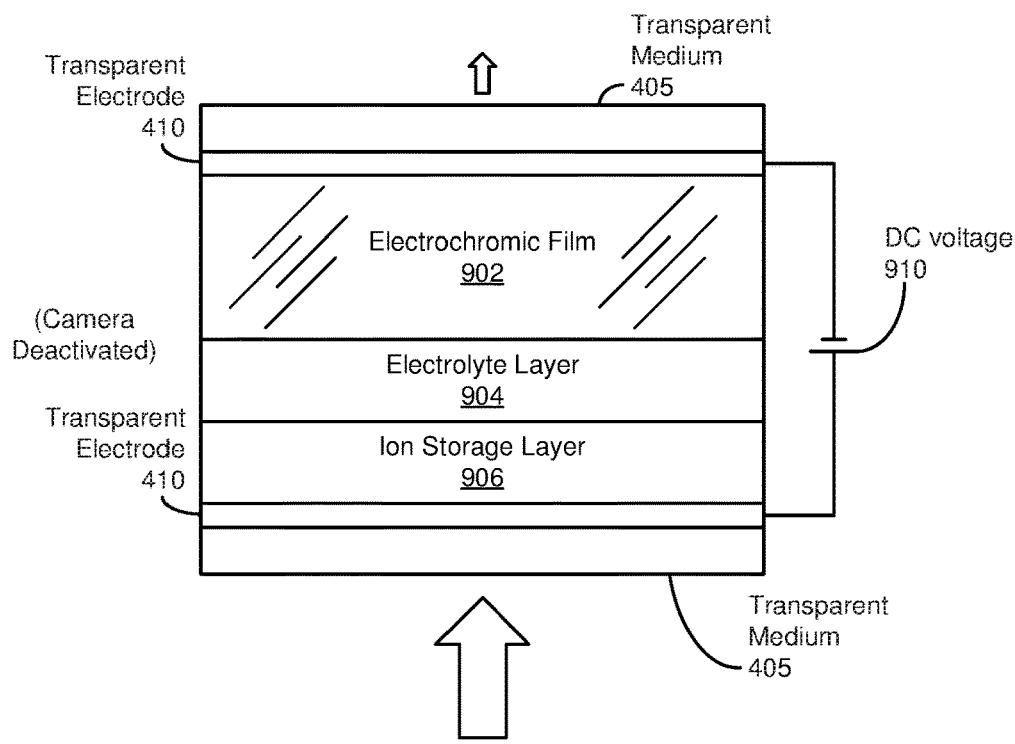

At least some embodiments of optical structure 215 may be implemented without the use of liquid crystals 401 and may instead involve the use of other optical media having electrically controllable optical states. For example, FIG. 9 is a conceptual side view of an exemplary optical structure 215F employing an electrochromic film or layer 902 in both a transparent optical state (upper part of FIG. 9) and a non-transparent optical state (lower part of FIG. 9). Electrochromic film 902, in some embodiments, may include any of a number of substances having one or more optical properties (e.g., transmission, absorption, reflectance, etc.) that are altered by way of a chemical reaction that is electrically stimulated (e.g., by way charge insertion/extraction or oxidation/reduction reactions). Examples of materials that may be incorporated in electrochromic file 902 may include, but are not limited to, some polymer films (e.g., viologens) and some transition metal oxides.

As depicted in FIG. 9, also included in optical structure 215F, as in other embodiments discussed above, are two elements of transparent media 405, each of which is located adjacent a corresponding transparent electrode 410. Between transparent electrodes 410, an electrochromic film 902, an electrolyte layer 904, and an ion storage layer 906 may be arranged. In some embodiments, electrolyte layer 904 may operate as an ion conductor that may provide cations or anions from ion storage layer 906, depending on the polarity of a DC voltage applied across electrochromic film 902. For example, applying DC voltage 910 (e.g., with the transparent electrode 410 adjacent electrochromic film 902 being at a lower potential than the transparent electrode 410 adjacent ion storage layer 906) may result in electrochromic layer 902 being placed in a non-transparent (e.g., colorful and/or translucent) optical state due to ions (e.g., cations) passing from ion storage layer 906 to charge-balance electrons from the transparent medium 405 adjacent electrochromic film 902. In some examples, removal of DC voltage 910 may result in the persistence of the non-transparent optical state. Further, application of an opposing DC voltage 912 (e.g., with the transparent electrode 410 adjacent electrochromic film 902 being at a higher potential than the transparent electrode 410 adjacent ion storage layer 906) may result in electrochromic layer 902 being placed in a transparent optical state due to ions (e.g., cations) being removed from electrochromic film 902 via electrolyte layer 904 to ion storage layer 906 as electrons are removed from electrochromic file 902 via adjacent transparent electrode 410. Moreover, in some examples, removal of DC voltage 912 thereafter may result in the transparent optical state being persistent prior to any reapplication of DC voltage 910.

While optical structure 215F is illustrated in FIG. 9 as transitioning between non-transparent and transparent optical states via DC voltage 910 and DC voltage 912, respectively, different levels and/or frequencies of AC voltage may be applied via transparent electrodes 410 to control the optical state of optical structure 215F in other embodiments.

Figure 10:
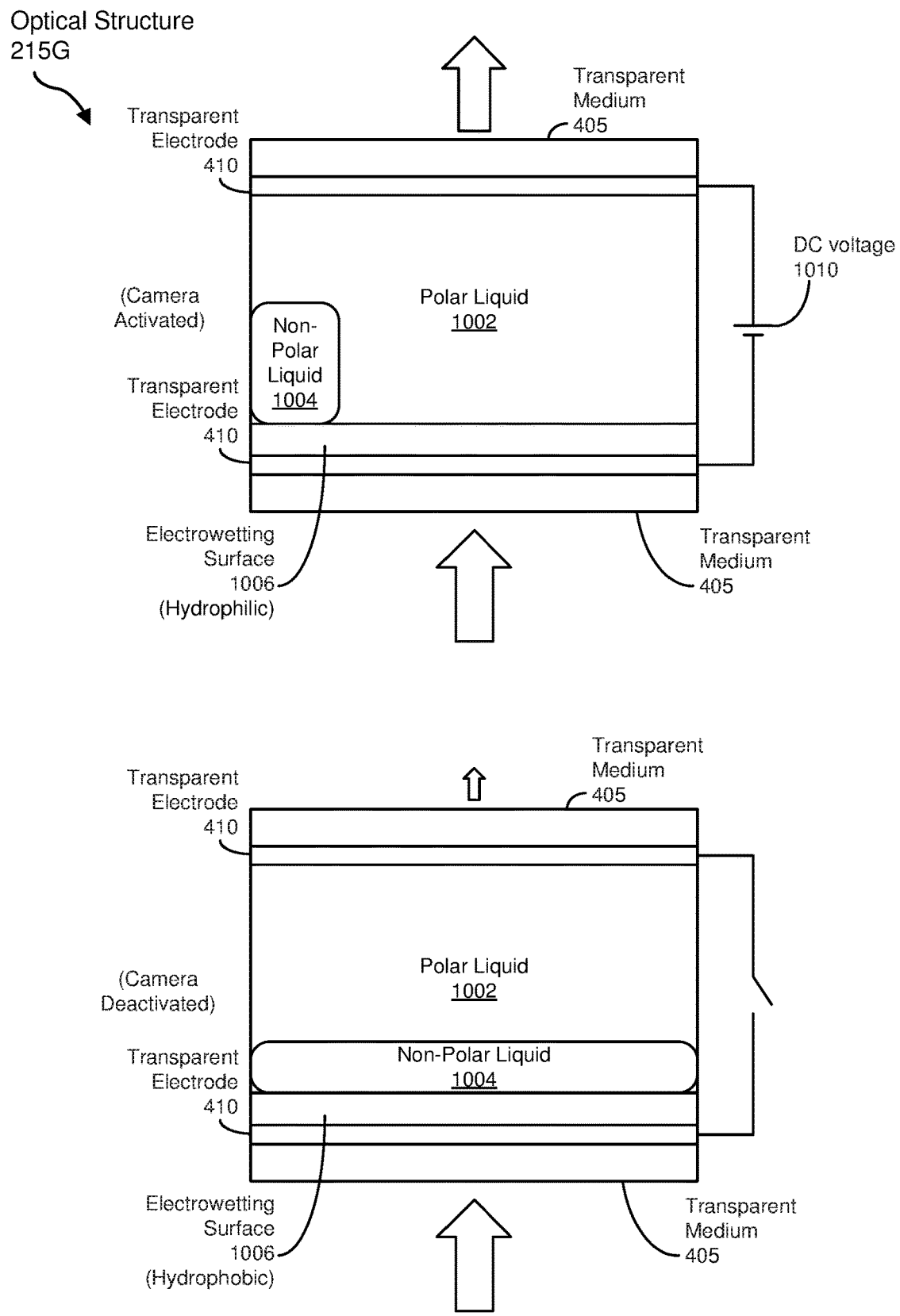
FIG. 10 is a conceptual side view of an exemplary optical structure employing an electrowetting surface interacting with a polar liquid and a non-polar liquid to facilitate a transparent state and a non-transparent state.

FIG. 10 is a conceptual side view of an exemplary optical structure 215G employing an electrowetting surface 1006 interacting with a polar liquid 1002 and a non-polar liquid 1004 to facilitate a transparent optical state (upper part of FIG. 10) and a non-transparent optical state (lower part of FIG. 10). In some embodiments, polar liquid 1002 and non-polar liquid 1004 may be retained within a chamber (not explicitly depicted in FIG. 10). As with prior optical structure 215 embodiments explained above, optical structure 215G may include two pairs of a transparent medium 405 and an adjacent transparent electrode 410. Adjacent one transparent medium 405 may be electrowetting surface 1006 (e.g., an amorphous fluoropolymer). In some embodiments, electrowetting surface 1006 may be normally hydrophobic in the absence of a voltage applied across polar liquid 1002 via transparent electrodes 410 (and, thus, an absence of electrical charge along electrowetting surface 1006). Consequently, polar liquid 1002 (e.g., water) may be repelled from electrowetting surface 1006, thereby facilitating the urging of non-polar liquid 1004 (e.g., a colored oil, ink, or dye) across most or substantially all of electrowetting surface 1006, thus placing optical structure 215G in a non-transparent state that may exhibit the color of non-polar liquid 1004.

However, in the presence of a DC voltage 1010 applied via transparent electrodes 410 across polar liquid 1002, electrowetting surface 1006 may be become hydrophilic (e.g., by the presence of electrical charge due to electrons positioned along electrowetting surface 1006), thus attracting polar liquid 1002, which may force non-polar liquid 1004 aside along a side perimeter or retaining surface of optical structure 215G, thus facilitating a transparent optical state for optical structure 215G.

In some embodiments, multiple such optical structures 215G, each with a different color of non-polar liquid 1004 (e.g., cyan, magenta, and yellow) may be stacked such that different colors may be presented during the non-transparent optical phase for overall optical structure 215G.

Figure 11:
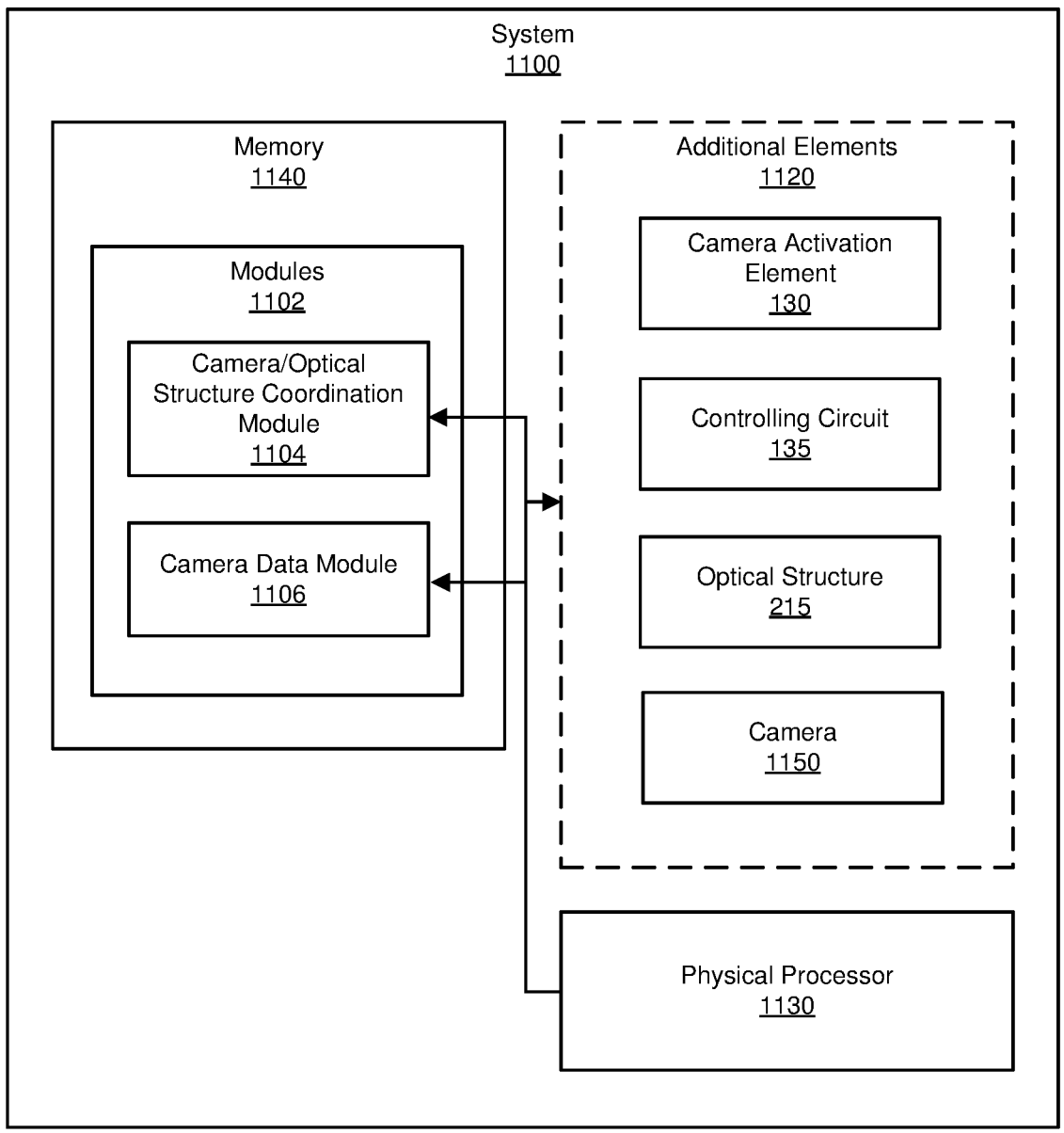
FIG. 11 is a block diagram of an exemplary system employing an optical structure serving as an electronic shutter for concealing and revealing a camera.

FIG. 11 is a block diagram of an exemplary system 1100 employing an optical structure 215 (e.g., any of optical structures 215A-215G discussed above) serving as an electronic shutter for concealing and revealing a camera 1150 (e.g., including camera lens 205). System 1100, in some embodiments, may serve as camera module 120 in conjunction with camera activation element 130 and controlling circuit 135 of FIG. 1. System 1100 may include one or more modules 1102 for performing one or more tasks. As will be explained more fully below, modules 1102 may include one or more of a camera/optical structure coordination module 1104 and a camera data module 1106.

One or more of modules 1102 in FIG. 11 may represent one or more software applications or programs that, when executed by a computing device, may cause the computing device to perform one or more tasks. System 1100 may also include one or more memory devices, such as memory 1140. Memory 1140 generally represents any type or form of volatile or non-volatile storage device or medium capable of storing data and/or computer-readable instructions, as noted above, as well as store, load, and/or maintain one or more of modules 1102. Moreover, system 1100 may also include one or more physical processors, such as physical processor 1130 that generally represents any type or form of hardware-implemented processing unit capable of interpreting and/or executing computer-readable instructions. In one example, physical processor 1130 may access and/or modify one or more of modules 1102 stored in memory 1140. Additionally or alternatively, physical processor 1130 may execute one or more of modules 1102 to provide electronic shutter functionality for, and coordinate that functionality with, camera 1150.

As illustrated in FIG. 11, and as mentioned above, exemplary system 1100 may also include one or more additional elements 1120, including camera activation element 130, controlling circuit 135, and optical structure 215, each of which is discussed in greater detail above. In addition, camera 1150 may be any still image and/or video camera configured to capture visible, infrared, ultraviolet, and/or other wavelength band or bands of light.

In some embodiments, camera/optical structure coordination module 1104 may receive a signal from camera activation element 130 indicating whether camera 1150 is to be activated or deactivated. In response to an activation of camera 1150, camera/optical structure coordination module 1104 may cause controlling circuit 135 to place optical structure 215 in a transparent optical state prior to the actual activation of camera 1150 to ensure the transparent optical state has been attained prior to activation. In some examples, camera/optical structure coordination module 1104 may take into account a typical or maximum amount of time consumed by optical structure 215 to attain the transparent optical state. In other examples, camera/optical structure coordination module 1104 may capture one or more still images, or frames of video, over time and compare them empirically to discern whether optical structure 215 has attained the transparent optical state. In response to the signal indicating a deactivation of camera 1150, camera/optical structure coordination module 1104 may ensure the capturing of image data by camera 1150 may be completed prior to causing controlling circuit 135 to place optical structure 215 in a non-transparent optical state. In yet other embodiments, a separate circuit may provided the activation and/or deactivation signal instead of camera activation element 130.

In view of the discussion presented above in conjunction with FIGS. 1-11, an electronic shutter may be provided that does not employ the use of moving mechanical parts to conceal and/or reveal the presence of a camera. Consequently, in some embodiments, this shutter functionality may facilitate a more aesthetically pleasing look of the overall device (e.g., eyewear device 100) when the camera is concealed, as well as provide a more discreet, less distracting indication to users in the vicinity of the camera of its presence and possible use. Additionally, in some examples, use of an electronic shutter may require less electrical power and physical volume to implement.

Example Embodiments

Example 1: An electronic shutter for a camera may include (1) an optical structure including a medium through which light from an environment passes to a lens of a camera for capturing an image of the environment, and (2) a controlling circuit that (a) detects a first condition of a signal, where the first condition indicates an activation of the camera, (b) controls, in response to the first condition, the optical structure such that the medium attains a transparent optical state, (c) detects a second condition of the signal, where the second condition indicates a deactivation of the camera, and (d) controls, in response to the second condition, the optical structure such that the medium attains a non-transparent optical state in a manner that prevents visual detection of the lens from the environment.

Example 2: The electronic shutter of Example 1, where the non-transparent optical state may include a translucent state.

Example 3: The electronic shutter of Example 1, where the non-transparent optical state may include an opaque state.

Example 4: The electronic shutter of any one of Examples 1-3, where the camera may further include a contrast surface located behind the optical structure such that the contrast surface provides an optical contrast to the optical structure in the transparent optical state.

Example 5: The electronic shutter of Example 4, where the contrast surface may surround the lens of the camera.

Example 6: The electronic shutter of any one of Examples 1-3, where (1) the medium may include a polymer-dispersed liquid-crystal (PDLC) medium, and (2) the controlling circuit may apply an alternating-current (AC) voltage across the PDLC medium along an optical axis of the lens in response to the first condition in a manner that causes the PDLC medium to attain the transparent optical state.

Example 7: The electronic shutter of any one of Examples 1-3, where (1) the medium may include a polymer network-stabilized liquid-crystal (PNLC) medium, and (2) the controlling circuit may apply an alternating-current (AC) voltage across the PNLC medium along an optical axis of the lens in response to the first condition in a manner that causes the PNLC medium to attain the transparent optical state.

Example 8: The electronic shutter of any one of Examples 1-3, where (1) the medium may include (a) a plurality of liquid crystals, and (b) a plurality of mobile ions interspersed among the plurality of liquid crystals, and (2) the controlling circuit may apply an alternating-current (AC) voltage across the optical structure along an optical axis of the lens at a first frequency in response to the first condition in a manner that allows the plurality of liquid crystals to align along the optical axis of the lens to attain the transparent optical state, and (3) the controlling circuit may apply the AC voltage across the medium along the optical axis of the lens at a second frequency lower than the first frequency in response to the second condition in a manner that allows the plurality of mobile ions to move in reaction to the AC voltage, where the plurality of mobile ions cause formation of a plurality of stable domains by the plurality of liquid crystals to attain the non-transparent optical state.

Example 9: The electronic shutter of Example 8, where the medium may further include anisotropic dye that aligns substantially with the plurality of liquid crystals along the optical axis of the lens in response to the AC voltage at the first frequency.

Example 10: The electronic shutter of any one of Examples 1-3, where (1) the optical structure may include (a) a first polarizer that polarizes light along a first direction perpendicular to an optical axis of the lens and (b) a second polarizer that polarizes light along a second direction perpendicular to the optical axis of the lens, where the first direction and the second direction differ by a predetermined angle, and (2) the medium may include a waveplate positioned between the first polarizer and the second polarizer, where the waveplate includes a plurality of liquid crystals that (a) allow a polarization of light passed between the first polarizer and the second polarizer to remain unaltered in response to a direct-current (DC) voltage applied across the waveplate along the optical axis of the lens, and (b) alter an angle of polarization of light passed between the first polarizer and the second polarizer by the predetermined angle in response to a lack of the DC voltage, and (3) the controlling circuit may apply the DC voltage across the waveplate along the optical axis of the lens in response to the second condition.

Example 11: The electronic shutter of any one of Examples 1-3, where (1) the medium may include (a) a plurality of liquid crystals that form a plurality of chiral microdomains, where (i) the plurality of chiral microdomains are aligned into a plurality of chiral macrodomains in response to an alternating-current (AC) voltage of a first frequency applied across the medium along an optical axis of the lens and (ii) the plurality of chiral microdomains are unaligned with each other about the medium in response to an AC voltage of a second frequency lower than the first frequency applied across the optical structure along the optical axis of the lens, and (2) the controlling circuit (a) may apply the AC voltage of the first frequency across the medium along the optical axis of the lens in response to the first condition and (b) may apply the AC voltage of the second frequency across the medium along the optical axis of the lens in response to the second condition.

Example 12: The electronic shutter of any one of Examples 1-3, where (1) the medium may include an electrochromic medium that (a) attains the transparent optical state in response to a first voltage applied across the electrochromic medium along an optical axis of the lens and (b) attains the non-transparent optical state in response to a second voltage applied across the electrochromic medium along the optical axis of the lens, and (2) the controlling circuit (a) may apply the first voltage in response to the first condition for a first period of time and (b) may apply the second voltage in response to the second condition for a second period of time.

Example 13: The electronic shutter of any one of Examples 1-3, where (1) the optical structure may include (a) a chamber including an electrowetting surface that (i) remains hydrophobic in an absence of a charge along the electrowetting surface and (ii) becomes hydrophilic in response to a charge along the electrowetting surface, and (2) the medium may include (a) a transparent polar liquid within the chamber, and (b) a non-transparent non-polar liquid with the chamber, (c) where the transparent polar liquid is repelled from the electrowetting surface in the absence of the charge, and (d) where the transparent polar liquid is attracted to the electrowetting surface in response to the charge, and (3) the controlling circuit may apply a voltage across the chamber along an optical axis of the lens to form the charge along the electrowetting surface in response to the first condition.

Example 14: The electronic shutter of any one of Examples 1-3, where (1) the optical structure may include (a) a first transparent electrode along a first side of the optical structure facing the lens and (b) a second transparent electrode along a second side of the optical structure opposite the first side, and (2) the controlling circuit may apply a voltage across the medium between the first transparent electrode and the second transparent electrode.

Example 15: The electronic shutter of Example 14, where the voltage may include an alternating-current (AC) voltage in response to the first condition.

Example 16: The electronic shutter of Example 14, where the voltage may include an alternating-current (AC) voltage in response to the second condition.

Example 17: The electronic shutter of Example 14, where (1) the voltage may include an alternative-current (AC) voltage, (2) the AC voltage may have a first frequency in response to the first condition, and (3) the AC voltage may have a second frequency lower than the first frequency in response to the second condition.

Example 18: A method may include (1) detecting, at a controlling circuit for an optical structure, a first condition of a signal, where the first condition indicates an activation of a camera, where the camera includes a lens that receives light from an environment through a medium of the optical structure for capturing an image of the environment, (2) controlling, by the controlling circuit in response to the first condition, the optical structure such that the medium attains a transparent optical state, (3) detecting, at the controlling circuit, a second condition of the signal, where the second condition indicates a deactivation of the camera, and (4) controlling, by the controlling circuit in response to the second condition, the optical structure such that the medium attains a non-transparent optical state that prevents visual detection of the lens from the environment.

Example 19: An eyewear device may include (1) a frame configured to be worn by a user, (2) at least one user lens mounted in the frame, (3) a camera mounted in the frame proximate the user lens, where the camera includes a camera lens, (4) an optical structure mounted in the frame, where the camera lens receives light from an external environment through a medium of the optical structure, (5) a camera activation element mounted in the frame, where the camera activation element is triggered by the user to activate and deactivate the camera, and (6) a controlling circuit mounted in the frame that (a) controls, in response to an activation of the camera, the optical structure such that the medium attains a transparent optical state and (b) controls, in response to a deactivation of the camera, the optical structure such that the medium attains a non-transparent optical state in a manner that prevents visual detection of the camera lens from the external environment.

Example 20: The eyewear device of Example 19, where the camera and the optical structure may be mounted in the frame proximate the user lens.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more modules may receive a signal indicating an activation and/or deactivation of a camera and then response to that indication by altering an optical state of a medium of an optical structure to a transparent or non-transparent state for revealing and/or concealing the presence of the camera. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An electronic shutter for a camera, the electronic shutter comprising:
   an optical structure comprising a medium through which light from an environment passes to a lens of a camera for capturing an image of the environment, wherein the medium comprises:
      a plurality of liquid crystals; and
      a plurality of mobile ions interspersed among the plurality of liquid crystals; and
   a controlling circuit that:
      detects a first condition of a signal, wherein the first condition indicates an activation of the camera;
      controls, in response to the first condition, the optical structure by applying an alternating-current (AC) voltage across the optical structure along the optical axis of the lens at a first frequency such that the medium attains a transparent optical state;
      detects a second condition of the signal, wherein the second condition indicates a deactivation of the camera; and
      controls, in response to the second condition, the optical structure by applying the AC voltage across the medium along the optical axis of the lens at a second frequency lower than the first frequency such that the medium attains a non-transparent optical state in a manner that prevents visual detection of the lens from the environment.

2. The electronic shutter of claim 1, wherein the non-transparent optical state comprises a translucent state.

3. The electronic shutter of claim 1, wherein the non-transparent optical state comprises an opaque state.

4. The electronic shutter of claim 1, wherein the camera further comprises a contrast surface located behind the optical structure such that the contrast surface provides an optical contrast to the optical structure in the transparent optical state.

5. The electronic shutter of claim 4, wherein the contrast surface surrounds the lens of the camera.

6. The electronic shutter of claim 1, wherein:
   the AC voltage, at the first frequency, allows the plurality of liquid crystals to align along the optical axis of the lens to attain the transparent optical state; and
   the AC voltage, at the second frequency, allows the plurality of mobile ions to move in reaction to the AC voltage, wherein the plurality of mobile ions cause formation of a plurality of stable domains by the plurality of liquid crystals to attain the non-transparent optical state.

7. The electronic shutter of claim 6, wherein:
   the medium further comprises anisotropic dye that aligns substantially with the plurality of liquid crystals along the optical axis of the lens in response to the AC voltage at the first frequency.

8. The electronic shutter of claim 1, wherein:
   the optical structure further comprises:
      a first transparent electrode along a first side of the optical structure facing the lens; and
      a second transparent electrode along a second side of the optical structure opposite the first side; and
   the controlling circuit applies the AC voltage across the medium between the first transparent electrode and the second transparent electrode.

9. A method comprising:
   detecting, at a controlling circuit for an optical structure, a first condition of a signal, wherein the first condition indicates an activation of a camera, wherein the camera comprises a lens that receives light from an environment through a medium of the optical structure for capturing an image of the environment, wherein the medium comprises:
      a plurality of liquid crystals; and
      a plurality of mobile ions interspersed among the plurality of liquid crystals;
   controlling, by the controlling circuit in response to the first condition, the optical structure by applying an alternating-current (AC) voltage across the optical structure along the optical axis of the lens at a first frequency such that the medium attains a transparent optical state;
   detecting, at the controlling circuit, a second condition of the signal, wherein the second condition indicates a deactivation of the camera; and
   controlling, by the controlling circuit in response to the second condition, the optical structure by applying the AC voltage across the medium along the optical axis of the lens at a second frequency lower than the first frequency such that the medium attains a non-transparent optical state that prevents visual detection of the lens from the environment.

10. An eyewear device comprising:
    a frame configured to be worn by a user;
    at least one user lens mounted in the frame;
    a camera mounted in the frame proximate the user lens, wherein the camera comprises a camera lens;
    an optical structure mounted in the frame, wherein the camera lens receives light from an external environment through a medium of the optical structure, wherein the medium comprises:
       a plurality of liquid crystals; and
       a plurality of mobile ions interspersed among the plurality of liquid crystals;
    a camera activation element mounted in the frame, wherein the camera activation element is triggered by the user to activate and deactivate the camera; and a controlling circuit mounted in the frame that:
  controls, in response to an activation of the camera, the optical structure bar applying an alternating-current (AC) voltage across the optical structure along the optical axis of the camera lens at a first frequency such that the medium attains a transparent optical state; and
  controls, in response to a deactivation of the camera, the optical structure bar applying the AC voltage across the medium along the optical axis of the camera lens at a second frequency lower than the first frequency such that the medium attains a non-transparent optical state in a manner that prevents visual detection of the camera lens from the external environment.

11. The eyewear device of claim 10, wherein the camera and the optical structure are mounted in the frame proximate the user lens.

12. The electronic shutter of claim 1, wherein the medium comprises a smectic A liquid crystal medium.

13. The electronic shutter of claim 6, wherein, at the first frequency, the AC voltage causes the plurality of liquid crystals to form a plurality of layers within the medium.

14. The electronic shutter of claim 7, wherein portions of the anisotropic dye vary in orientation in response to the AC voltage at the second frequency.

15. The electronic shutter of claim 14, wherein the anisotropic dye comprises a first color that is different from gray or white.

16. The method of claim 9, wherein the non-transparent optical state comprises one of a translucent state or an opaque state.

17. The method of claim 9, wherein the AC voltage, at the first frequency, allows the plurality of liquid crystals to align along the optical axis of the lens to attain the transparent optical state.

18. The method of claim 9, wherein the AC voltage, at the second frequency, allows the plurality of mobile ions to move in reaction to the AC voltage, wherein the plurality of mobile ions cause formation of a plurality of stable domains by the plurality of liquid crystals to attain the non-transparent optical state.

19. The method of claim 9, wherein the camera further comprises a contrast surface located behind the optical structure such that the contrast surface provides an optical contrast to the optical structure in the transparent optical state.

20. The method of claim 19, wherein the contrast surface surrounds the lens of the camera.

* * * * *